US012725247B2

(12) United States Patent
Kurita et al.

(10) Patent No.: US 12,725,247 B2
(45) Date of Patent: Sep. 1, 2026

(54) WORKPIECE QUALITY DETERMINATION METHOD AND WORKPIECE QUALITY DETERMINATION SYSTEM

(71) Applicant: HONDA MOTOR CO., LTD., Tokyo (JP)

(72) Inventors: Takumi Kurita, Tokyo (JP); Yoshio Kanai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 388 days.

(21) Appl. No.: 18/366,685

(22) Filed: Aug. 8, 2023

(65) Prior Publication Data

US 2024/0095905 A1 Mar. 21, 2024

(30) Foreign Application Priority Data

Sep. 16, 2022 (CN) ......................... 202211129372.5

(51) Int. Cl.
*G06T 7/00* (2017.01)
*G01B 11/25* (2006.01)

(52) U.S. Cl.
CPC ........... *G06T 7/001* (2013.01); *G01B 11/254* (2013.01)

(58) Field of Classification Search
CPC ........... G06T 7/001; G06T 2207/10152; G06T 2207/30164; G06T 7/521; G01B 11/254; G01B 11/167; G01N 21/9515; G01N 2021/8829
See application file for complete search history.

(56) References Cited

U.S. PATENT DOCUMENTS

2019/0246085 A1* 8/2019 Oike .................... H04N 9/3147

FOREIGN PATENT DOCUMENTS

JP 2008058036 A * 3/2008
JP 2014215219 A * 11/2014 ............. G01N 21/88
JP 2014224803 A 12/2014

* cited by examiner

*Primary Examiner* — Samir A Ahmed
(74) *Attorney, Agent, or Firm* — CKC & Partners Co., LLC

(57) ABSTRACT

A workpiece quality determination system for determining the quality of a workpiece based on a stripe pattern projected on a surface of the workpiece includes an observation angle setter that sets an observation angle at which the projected stripe pattern on the workpiece is observed, a stripe projection angle setter that sets the stripe projection angle of the projected stripe pattern at the set observation angle, a reference stripe pattern creator that creates a reference stripe pattern from the projected stripe pattern at the set stripe projection angle, and a quality determinator that calculates a difference between the projected stripe pattern and the reference stripe pattern at the stripe projection angle to determine the quality based on the difference.

10 Claims, 12 Drawing Sheets

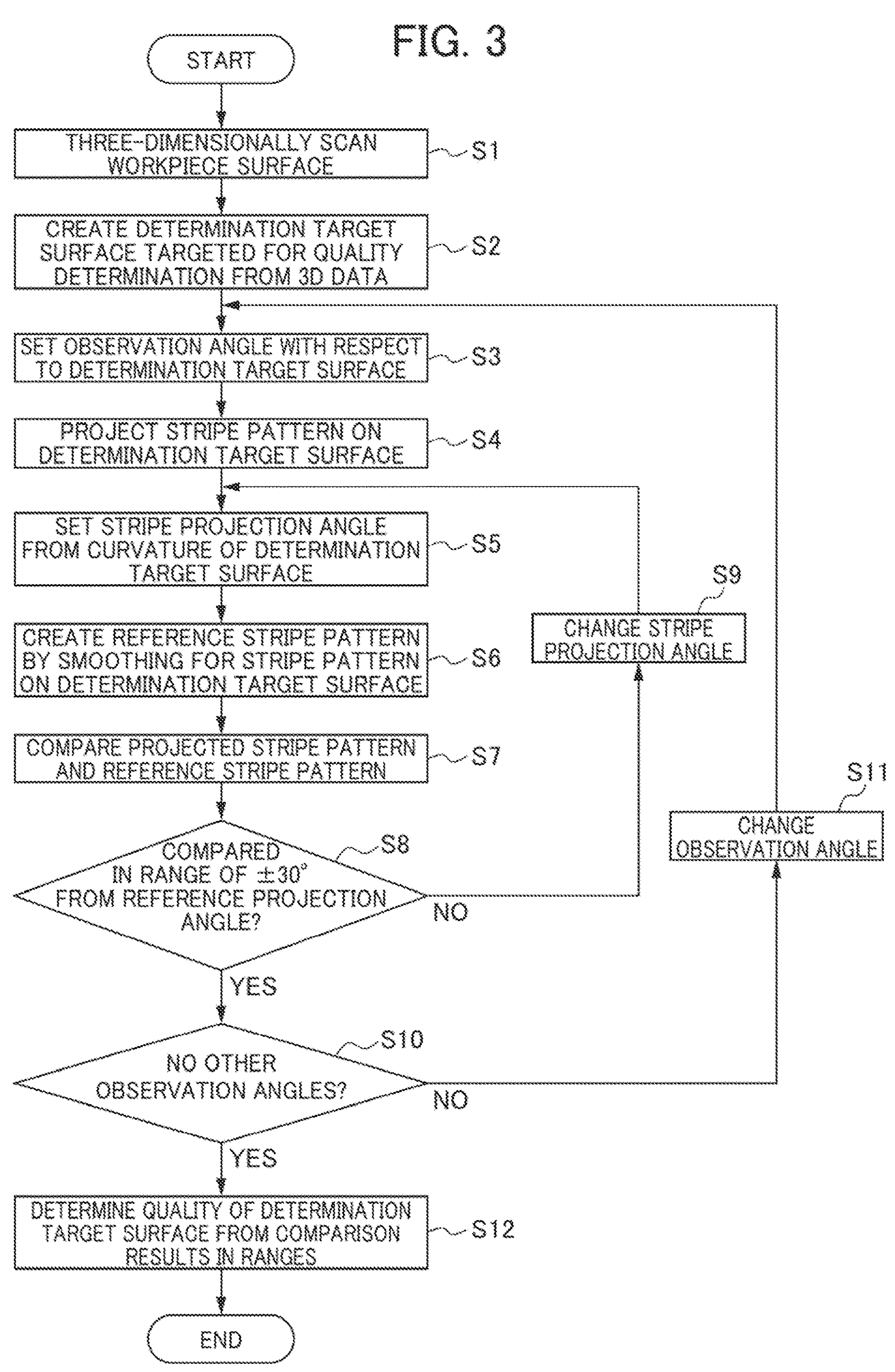
FIG. 3
START
THREE-DIMENSIONALLY SCAN WORKPIECE SURFACE
S1
CREATE DETERMINATION TARGET SURFACE TARGETED FOR QUALITY DETERMINATION FROM 3D DATA
S2
SET OBSERVATION ANGLE WITH RESPECT TO DETERMINATION TARGET SURFACE
S3
PROJECT STRIPE PATTERN ON DETERMINATION TARGET SURFACE
S4
SET STRIPE PROJECTION ANGLE FROM CURVATURE OF DETERMINATION TARGET SURFACE
S5
CREATE REFERENCE STRIPE PATTERN BY SMOOTHING FOR STRIPE PATTERN ON DETERMINATION TARGET SURFACE
S6
COMPARE PROJECTED STRIPE PATTERN AND REFERENCE STRIPE PATTERN
S7
COMPARED IN RANGE OF ±30° FROM REFERENCE PROJECTION ANGLE?
S8
NO
YES
S9
CHANGE STRIPE PROJECTION ANGLE
NO OTHER OBSERVATION ANGLES?
S10
NO
YES
S11
CHANGE OBSERVATION ANGLE
DETERMINE QUALITY OF DETERMINATION TARGET SURFACE FROM COMPARISON RESULTS IN RANGES
S12
END H1
H2
H3
H
T
Wa
Ep
X
200

T
B
X
-D2
-θ1
D0
Ep
+θ1
Wa
200
+D1

WORKPIECE QUALITY DETERMINATION METHOD AND WORKPIECE QUALITY DETERMINATION SYSTEM

This application is based on and claims the benefit of priority from Chinese Patent Application No. 202211129372.5, filed on 16 Sep. 2022, the content of which is incorporated herein by reference.

BACKGROUND OF THE INVENTION

Field of the Invention

The present invention relates to a workpiece quality determination method and a workpiece quality determination system.

Related Art

An industrial product such as a body of an automobile is molded by machining such as pressing or welding of steel plates. Such machining is performed based on values set in advance. However, depending on the thickness, composition, etc. of the steel plate, the shape of the molded industrial product slightly varies. For this reason, the shape of the molded industrial product is observed and it is determined (quality determination) whether or not there is deformation such as a dent.

Conventionally, such quality determination has been performed in such a manner that an observer visually checks a stripe pattern (hereinafter may be referred to as a "projected stripe pattern") projected on a workpiece surface. However, determination by visual checking depends on the observer's experience, leading to a problem that a determination result varies depending on the observer.

For these reasons, a method for automating quality determination on a workpiece surface has been conventionally proposed. For example, Japanese Unexamined Patent Application, Publication No. 2014-224803 describes that quality determination is automatically performed as follows. Using reference shape data which is three-dimensional shape data on a workpiece design, a stripe pattern is projected in a reference shape and a reference stripe pattern is created accordingly. A difference between the reference stripe pattern and the projected stripe pattern is calculated in such a manner that the reference stripe pattern is slid with respect to the projected stripe pattern on the workpiece surface. Quality determination is automatically performed based on such a difference. According to this technique, the deformation of the workpiece surface can be automatically detected regardless of the observer's experience.

Patent Document 1: Japanese Unexamined Patent Application, Publication No. 2014-224803

SUMMARY OF THE INVENTION

The method described in Japanese Unexamined Patent Application, Publication No. 2014-224803 requires the reference shape data, which is the three-dimensional shape data on the workpiece design, in order to create the reference stripe pattern. However, it is actually difficult to mold the workpiece such that the shape of the molded industrial product perfectly matches the reference shape data which is the three-dimensional data. For this reason, there has been a problem that even by comparison between the reference shape data and the shape of the industrial product, the comparison result does not correlate with the actual deformation.

The present invention is intended to provide workpiece quality determination method and system capable of automatically determining, without the need for reference shape data on a workpiece, whether or not there is deformation of a surface of the workpiece.

(1) The workpiece quality determination method of the present disclosure is a workpiece quality determination method for determining the quality of a workpiece (e.g., later-described workpiece W) based on a stripe pattern projected on a surface of the workpiece. The method includes observation angle setting (e.g., step executed by a later-described observation angle setter 12) of setting an angle at which the stripe pattern (e.g., later-described projected stripe pattern 300) projected on the workpiece is observed, stripe projection angle setting (e.g., step executed by a later-described stripe projection angle setter 13) of setting the stripe projection angle of the projected stripe pattern at the set observation angle, reference stripe pattern creation (e.g., step executed by a later-described reference stripe creator 14) of creating a reference stripe pattern (e.g., later-described reference stripe pattern 301) from the projected stripe pattern at the set stripe projection angle, and quality determination (e.g., step executed by a later-described quality determinator 15) of calculating a difference between the projected stripe pattern and the reference stripe pattern at the stripe projection angle to determine the quality based on the difference.

(2) The workpiece quality determination method according to (1), in which a stripe projection angle with respect to the curve long-side direction of the workpiece is preferably taken as a reference projection angle, and in the quality determination, the quality is preferably determined by changing the stripe projection angle to a plurality of angles from the reference projection angle.

(3) The workpiece quality determination method according to (1) or (2), in which the difference is preferably obtained based on the angle between the projected stripe pattern and the reference stripe pattern and the amplitude thereof.

(4) The workpiece quality determination system of the present disclosure is a workpiece quality determination system (e.g., later-described workpiece quality determination system 1) for determining the quality of a workpiece (e.g., later-described workpiece W) based on a stripe pattern projected on a surface of the workpiece. The system includes an observation angle setter (e.g., later-described observation angle setter 12) that sets an observation angle at which the stripe pattern (e.g., later-described projected stripe pattern 300) projected on the workpiece is observed, a stripe projection angle setter (e.g., later-described stripe projection angle setter 13) that sets the stripe projection angle of the projected stripe pattern at the set observation angle, a reference stripe creator (e.g., later-described reference stripe pattern creator 14) that creates a reference stripe pattern (e.g., later-described reference stripe pattern 301) from the projected stripe pattern at the set stripe projection angle, and a quality determinator (e.g., later-described quality determinator 15) that calculates a difference between the projected stripe pattern and the reference stripe pattern at the stripe projection angle to determine the quality based on the difference.

(5) The workpiece quality determination system according to (4), in which a stripe projection angle with respect to the curve long-side direction of the workpiece is preferably taken as a reference projection angle, and the quality determinator preferably determines the quality by changing the stripe projection angle to a plurality of angles from the reference projection angle.

(6) The workpiece quality determination system according to (4) or (5), in which the difference is preferably obtained based on the angle between the projected stripe pattern and the reference stripe pattern and the amplitude thereof.

According to the workpiece quality determination method of (1), since the reference stripe pattern is created from the projected stripe pattern on the workpiece, it can be automatically determined, without the need for reference shape data on the workpiece, whether or not the surface of the workpiece is subjected to deformation. Since the reference stripe pattern is created from the projected stripe pattern, evaluation can be made with reference to an actual appearance. Since the observation angle of the projected stripe pattern on the workpiece and the stripe projection angle of the projected stripe pattern at each observation angle are set, the surface of the workpiece can be quantitatively evaluated from various angles, and therefore, high-accuracy quality determination can be made without variation in evaluation results.

According to the workpiece quality determination method of (2), since the stripe projection angle is set with reference to the curve long-side direction of the workpiece, stable results can be obtained particularly in a case where a determination target surface is a narrow curved surface. With this configuration, the workpiece quality determination method can be provided with high versatility.

According to the workpiece quality determination method of (3), since the difference is calculated from the angle between the projected stripe pattern and the reference stripe pattern and the amplitude thereof, a step such as a step of sliding the reference stripe pattern with respect to the projected stripe pattern is not necessary. Thus, quality determination can be made more easily and quickly.

According to the workpiece quality determination system of (4), since the reference stripe pattern is created from the projected stripe pattern on the workpiece, it can be automatically determined, without the need for reference shape data on the workpiece, whether or not the surface of the workpiece is subjected to deformation. Since the reference stripe pattern is created from the projected stripe pattern, evaluation can be made with reference to an actual appearance. Since the observation angle of the projected stripe pattern on the workpiece and the stripe projection angle of the projected stripe pattern at each observation angle are set, the surface of the workpiece can be quantitatively evaluated from various angles, and therefore, high-accuracy quality determination can be made without variation in evaluation results.

According to the workpiece quality determination system of (5), since the stripe projection angle is set with reference to the curve long-side direction of the workpiece, stable results can be obtained particularly in a case where a determination target surface is a narrow curved surface. With this configuration, the workpiece quality determination system can be provided with high versatility.

According to the workpiece quality determination system of (6), since the difference is calculated from the angle between the projected stripe pattern and the reference stripe pattern and the amplitude thereof, a complicated step such as a step of sliding the reference stripe pattern with respect to the projected stripe pattern is not necessary. Thus, quality determination can be made more easily and quickly.

BRIEF DESCRIPTION OF THE DRAWINGS

FIG. 3 is a flowchart showing one example of the flow of the processing of the workpiece quality determination system;

DETAILED DESCRIPTION OF THE INVENTION

Figure 1:
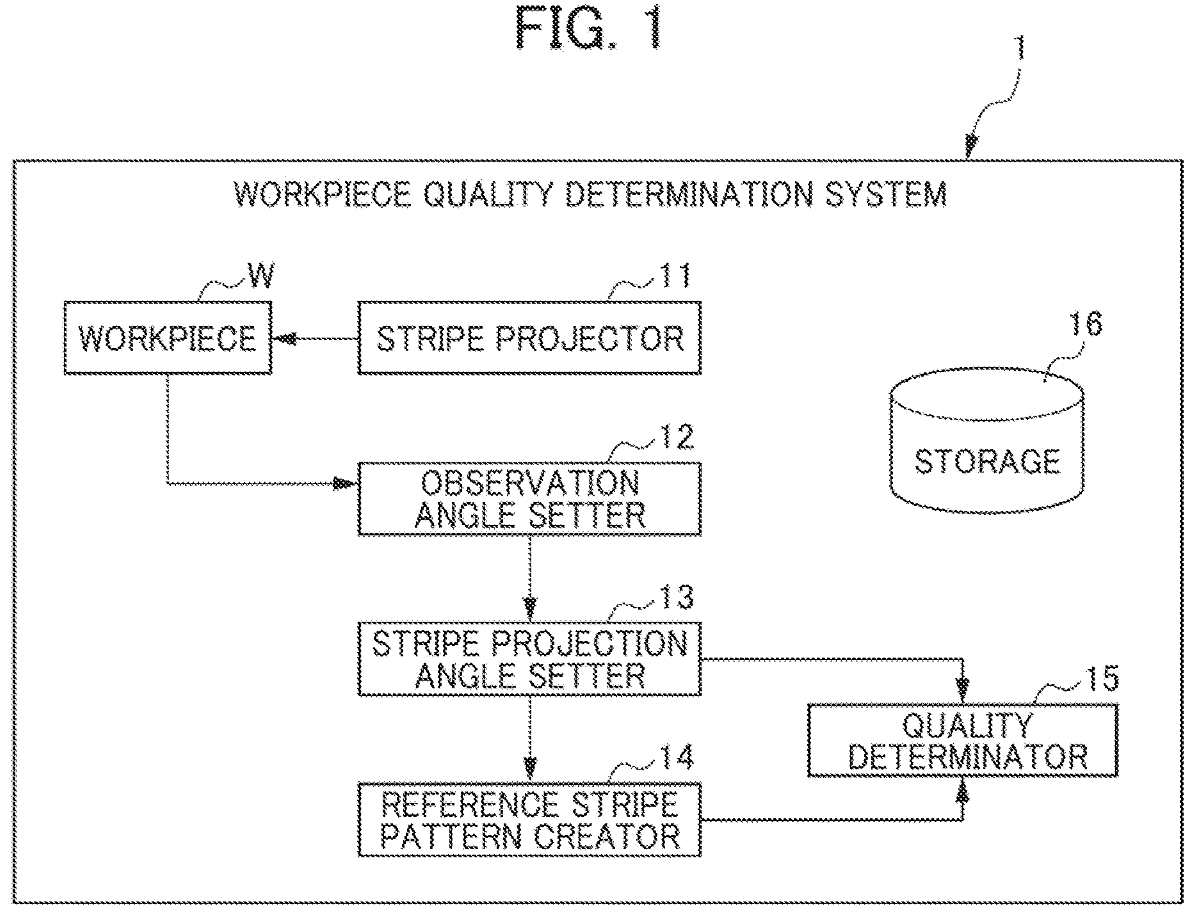
FIG. 1 is a block diagram showing a functional configuration of a workpiece quality determination system.

A workpiece quality determination method and a workpiece quality determination system, to which the method is applied, according to the present disclosure will be described with reference to FIGS. 1 to 12. First, the functions of the workpiece quality determination system 1 of the present disclosure will be described with reference to FIG. 1. FIG. 1 is a block diagram showing a functional configuration of the workpiece quality determination system 1.

[Functions of Workpiece Quality Determination System 1]

The workpiece quality determination system 1 includes a stripe projector 11, an observation angle setter 12, a stripe projection angle setter 13, a reference stripe pattern creator 14, a quality determinator 15, and a storage 16.

The stripe projector 11 projects, on a surface of a workpiece W, a stripe pattern to be used for quality determination. Specifically, the stripe projector 11 specifies a determination target surface, which is targeted for quality determination, of the surface of the workpiece W, and projects the stripe pattern on the determination target surface.

The observation angle setter 12 sets an angle (hereinafter may be referred to as an "observation angle") at which a projected stripe pattern which is the stripe pattern projected on the surface of the workpiece W is observed. Although details will be described later, the observation angle of the projected stripe pattern is set to a plurality of angles different in a field of view in the front-rear direction and the up-down direction of the workpiece W.

The stripe projection angle setter 13 sets the projection angle of the stripe pattern projected on the surface of the workpiece W. Although details will be described later, the projection angle is set to a plurality of projection angles different in the angle of the direction of extension of a line segment forming the projected stripe pattern with respect to a reference projection angle.

The reference stripe pattern creator 14 performs smoothing for the projected stripe pattern on the determination target surface of the workpiece W, thereby creating a reference stripe pattern from the projected stripe pattern. In a case where there is surface deformation (asperities) of the workpiece W, such deformation is visible as bends of the projected stripe pattern. The reference stripe pattern creator 14 performs smoothing for each line segment of the projected stripe pattern on the determination target surface of the workpiece W, thereby creating the reference stripe pattern with no bends or less bends from the projected stripe pattern. Smoothing is performed in such a manner that a plurality of control points on a line segment forming the projected stripe pattern is decimated and a single smooth curved line is formed from such a line segment. Such smoothing processing is well-known, and for example, an existing method such as non-uniform rational B-spline (NURBS) may be employed.

The quality determinator 15 compares the projected stripe pattern and the reference stripe pattern with each other at each observation angle of the projected stripe pattern set by the observation angle setter 12 and each projection angle of the projected stripe pattern set by the stripe projection angle setter 13 to calculate a difference therebetween, thereby making, based on the calculated difference, quality determination on whether or not the determination target surface of the workpiece W is subjected to deformation.

The storage 16 stores, for example, three-dimensional shape data on the workpiece W and data created in each type of processing.

[Configuration of Workpiece Quality Determination System 1]

Next, a specific configuration of the workpiece quality determination system 1 will be described with reference to FIGS. 2A and 2B. The workpiece quality determination system 1 includes a computer 102 capable of performing three-dimensional image processing.

Figure 2A:
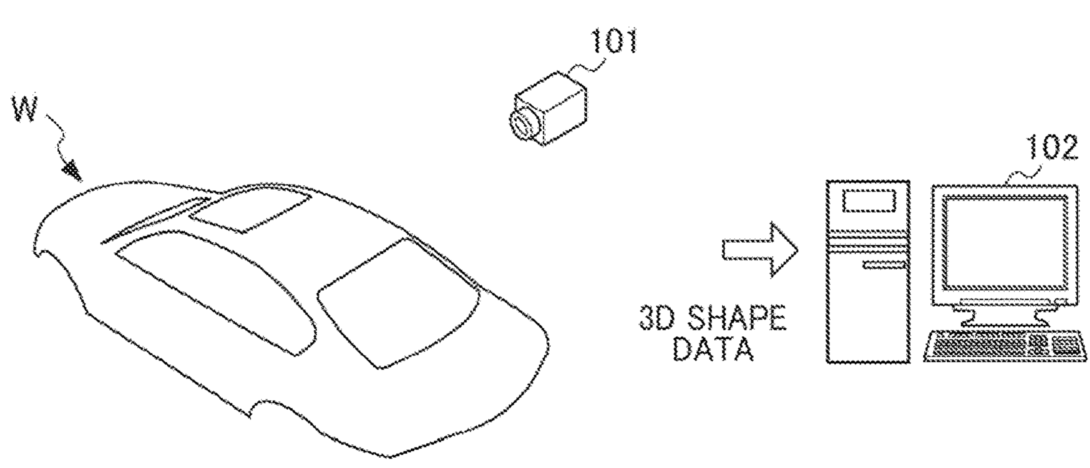
FIG. 2A is a view showing one example of the configuration of the workpiece quality determination system.

One example of the workpiece quality determination system 1 is shown in FIG. 2A. As shown in FIG. 2A, the workpiece quality determination system 1 includes a three-dimensional scanner 101 capable of measuring the surface shape of the workpiece W and the computer 102. The workpiece quality determination system 1 in the present embodiment in a case where a body of an automobile is used as the workpiece W targeted for quality determination will be described. However, the workpiece W targeted for quality determination is not limited to the body of the automobile, and may be an arbitrary industrial product, the surface quality of which after molding needs to be determined.

The three-dimensional scanner 101 measures the surface shape of the workpiece W, and supplies three-dimensional shape data which is a measurement result to the computer 102. A predetermined program capable of performing three-dimensional image processing such as projection of the stripe pattern on the measured surface shape of the workpiece W, change of the observation angle of the projected stripe pattern, and change of the projection angle is installed in the computer 102. Using the three-dimensional shape data supplied from the three-dimensional scanner 101, the computer 102 performs three-dimensional image processing of executing the later-described workpiece quality determination method, thereby determining the quality of the workpiece W.

Figure 2B:
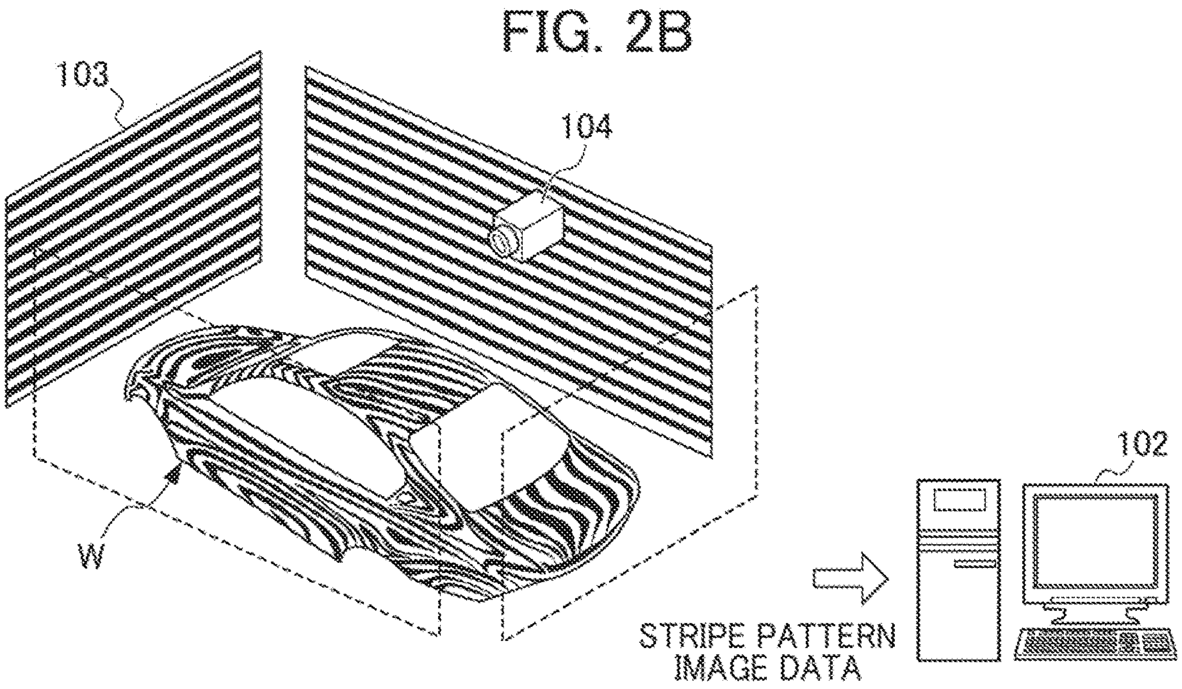
FIG. 2B is a view showing another example of the configuration of the workpiece quality determination system.

Another example of the workpiece quality determination system 1 is shown in FIG. 2B. As shown in FIG. 2B, the workpiece quality determination system 1 includes a stripe projection device 103 that projects the stripe pattern on the surface of the workpiece W, a camera 104 that photographs the stripe pattern (projected stripe pattern) projected on the workpiece W, and the computer 102.

The stripe projection device 103 is a wall surface formed with the stripe pattern, and is arranged around the workpiece W. When the workpiece W is irradiated with light from the stripe projection device 103, the stripe pattern formed on the stripe projection device 103 is projected on the surface of the workpiece W. At this time, the stripe projection device 103 can set the projection angle of the projected stripe pattern with respect to the surface of the workpiece W to a plurality of different angles. The camera 104 photographs the projected stripe pattern on the surface of the workpiece W, and supplies image data on the photographed projected stripe pattern to the computer 102. At this time, the camera 104 can photograph the workpiece W from various angles by changing the field of view, thereby setting the observation angle of the projected stripe pattern to a plurality of different angles. Using the image data (projected stripe pattern) supplied from the camera 104, the computer 102 performs the three-dimensional image processing of executing the later-described workpiece quality determination method. In this manner, the computer 102 determines the quality of the workpiece W.

Note that the stripe projection device 103 may be merely a wall with no light source. As long as the stripe pattern is formed on the wall provided around the workpiece W, the stripe pattern is reflected on the surface of the workpiece W without the need for irradiating the workpiece W with light from the stripe projection device 103.

In the workpiece quality determination system 1 with the configuration shown in FIG. 2A, processor and memory of the computer 102 implement the functions of the above-described stripe projector 11, observation angle setter 12, stripe projection angle setter 13, reference stripe pattern creator 14, quality determinator 15, and storage 16. In the workpiece quality determination system 1 with the configuration shown in FIG. 2B, the stripe projection device 103 functions as the stripe projector 11 and the stripe projection angle setter 13, the camera 104 functions as the observation angle setter 12, and the processor and memory of the computer 102 function as the reference stripe pattern creator 14, the quality determinator 15, and storage 16.

[Operation of Workpiece Quality Determination System 1]

Subsequently, operation of the workpiece quality determination system 1 will be described with reference to FIGS. 3 to 12. As operation of the workpiece quality determination system 1 described in the present embodiment, operation of the workpiece quality determination system 1 with the configuration shown in FIG. 2A will be described as an example.

FIG. 3 is a flowchart showing the flow of the processing of the workpiece quality determination system 1. In Step S1, the three-dimensional scanner 101 measures the surface of the workpiece W, thereby acquiring the three-dimensional shape data on the surface of the workpiece W and supplying the acquired three-dimensional shape data to the computer 102.

Figure 4:
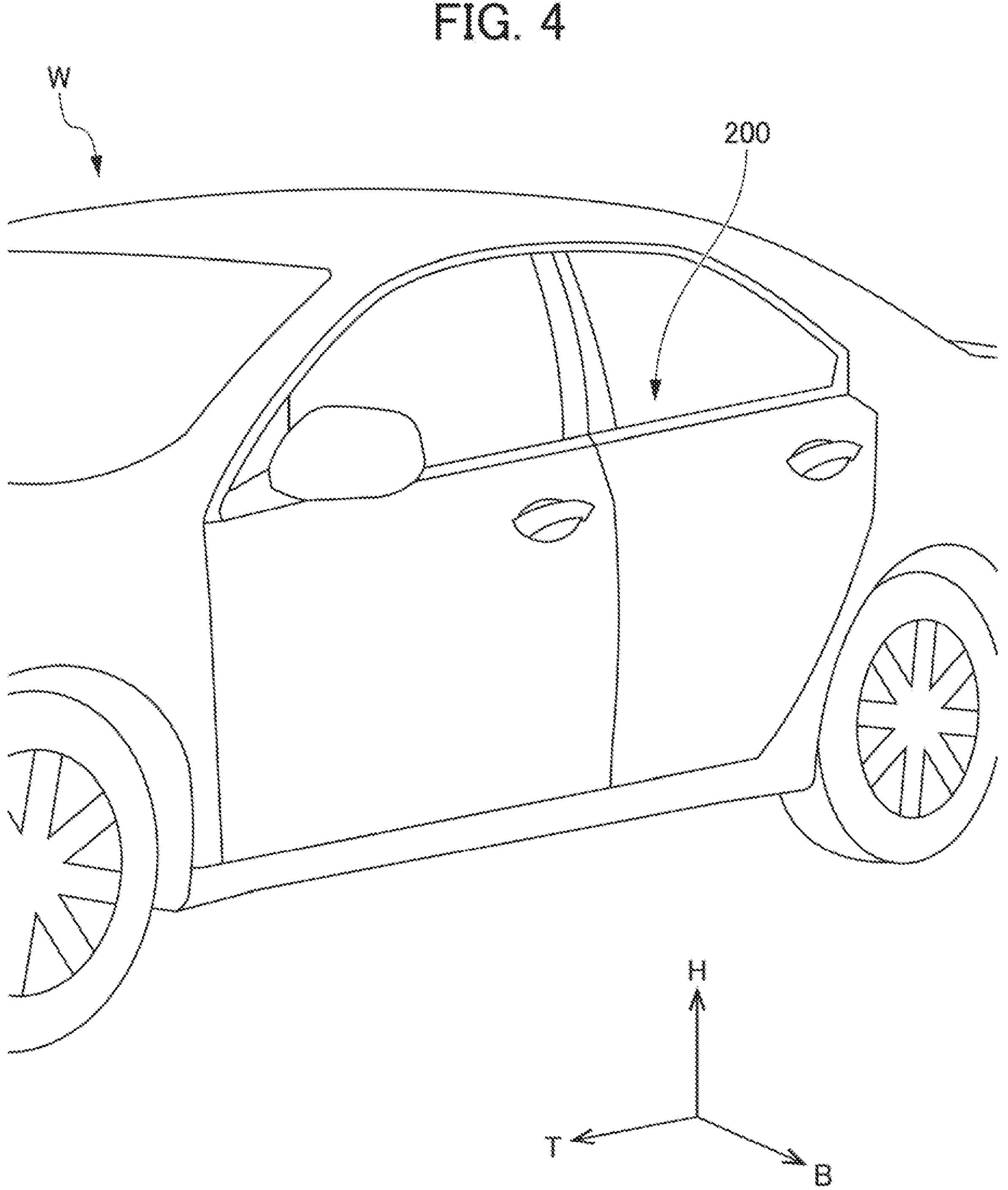
FIG. 4 is a perspective view showing part of a workpiece targeted for quality determination.

Subsequently, in Step S2, the computer 102 (stripe projector 11) creates, based on the three-dimensional shape data supplied from the three-dimensional scanner 101, the determination target surface (computer aided design (CAD) surface) targeted for quality determination. Here, a left door 200 of the body of the automobile is the determination target surface as shown in FIG. 4. Of directions shown in the figure, T indicates the front-rear direction of the body, B indicates the width direction of the body, and H indicates the up-down direction of the body.

Next, in Step S3, the computer 102 (observation angle setter 12) sets, with respect to the determination target surface created in Step S2, the observation angle of the projected stripe pattern for quantitatively evaluating the determination target surface (observation angle setting step).

Figure 5:
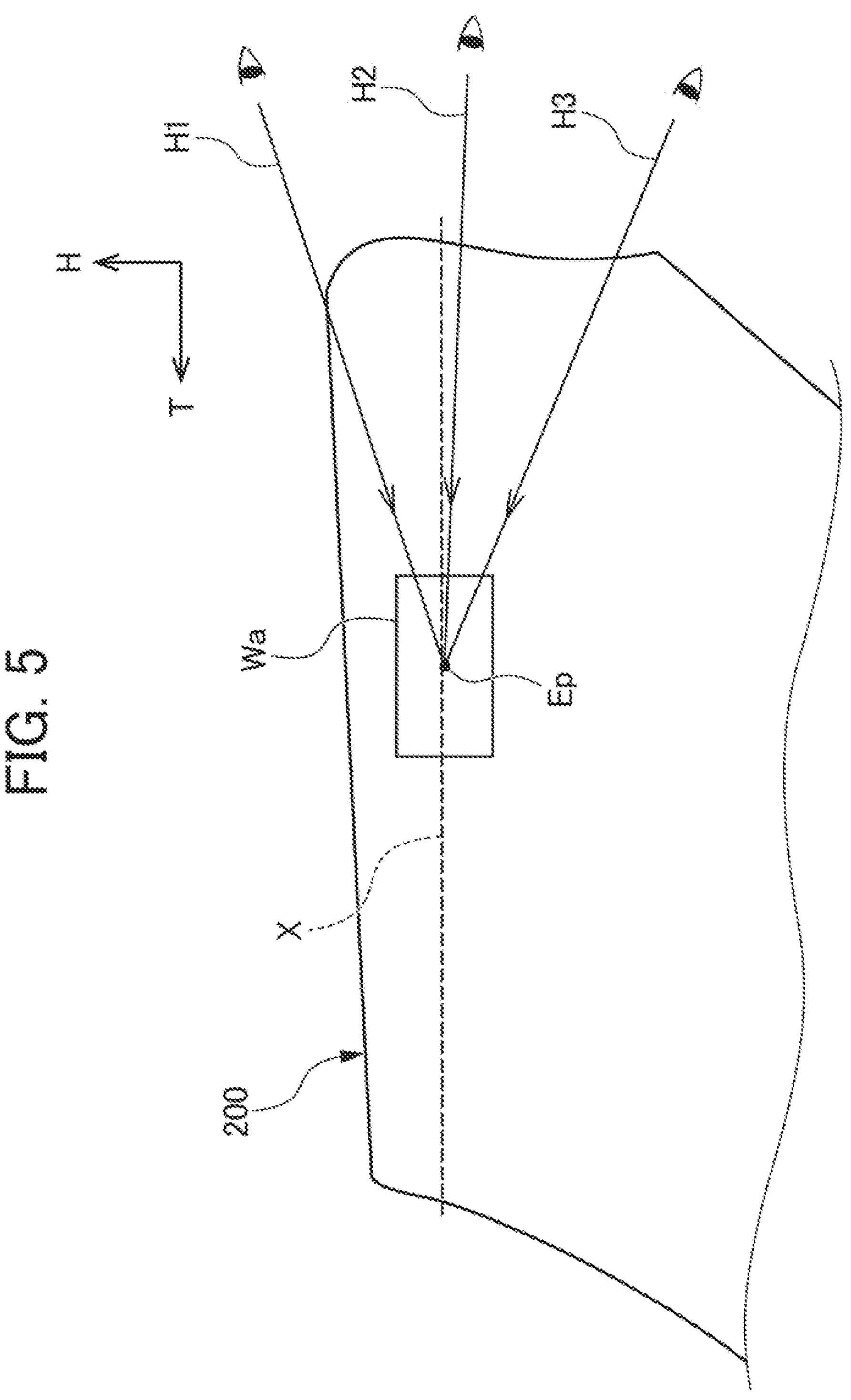
FIG. 5 is a front view of a determination target surface for describing a method for setting an observation angle with respect to the determination target surface.

A method for setting the observation angle of the projected stripe pattern with respect to the determination target surface will be described with reference to FIGS. 5 and 6. FIG. 5 is a front view of the left door 200 which is the determination target surface, and FIG. 6 is a plan view of the left door 200 which is the determination target surface.

First, as shown in FIG. 5, the computer 102 (observation angle setter 12) selects an evaluation spot Wa to be evaluated on the determination target surface (left door 200) and the coordinate value of an evaluation point Ep included in the evaluation spot Wa. As a method for specifying the evaluation spot Wa, various methods can be employed depending on the situation. For example, the evaluation spot Wa may be arbitrarily specified by sensory evaluation by an examiner, or be specified in such a manner that a color map indicating the asperities is created by curvature analysis (Gaussian curvature) on the determination target surface (left door 200) and a portion with a sharp change in the asperities is specified. Alternatively, the evaluation spot Wa may be defined in advance by computer aided engineering (CAE) analysis.

Figure 6:
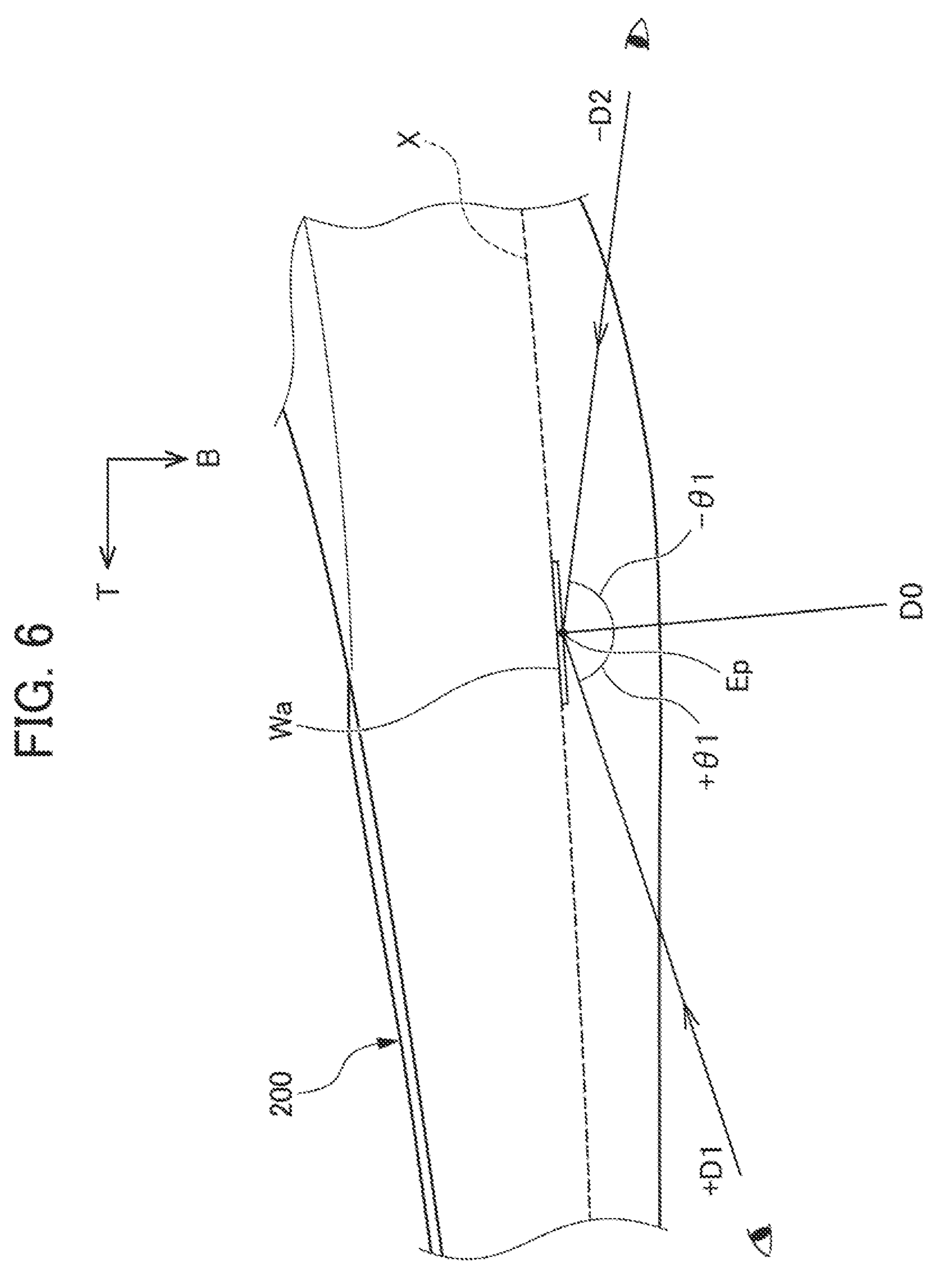
FIG. 6 is a plan view of the determination target surface for describing the method for setting the observation angle with respect to the determination target surface.

Subsequently, the computer 102 (observation angle setter 12) first sets a horizontal section line X passing through the evaluation point Ep and defines the frontal side DO of the curve of the determination target surface (left door 200) with respect to the horizontal section line X, as shown in FIG. 6. The frontal side D0 of the curve is a direction perpendicular to the tangent to the evaluation point Ep on the horizontal section line X at the evaluation spot Wa. Next, the computer 102 (observation angle setter 12) sets, in the horizontal direction, a predetermined angle +θ1 on the front side of the body and a predetermined angle −θ1 on the rear side of the body with respect to the frontal side D0. The predetermined angle is set to the same angle between the front side and the rear side. With this configuration, an observation condition for the same evaluation spot Wa can be met between the front side and the rear side, and quality determination can be properly made with high accuracy.

A specific angle ±θ is preferably set to such a practical angle from the eye level of a user (owner of the automobile) of the workpiece W that the deformation at the evaluation spot Wa is visible. In the present embodiment, the angle is set to ±75°. However, the specific angle ±θ may vary depending on, e.g., the type of workpiece W or the position of the evaluation spot Wa, and is not limited to ±75°.

Subsequently, the computer 102 (observation angle setter 12) sets, with respect to the determination target surface (left door 200), a plurality of angles different in a position in a height direction, as shown in FIG. 5. Specifically, an angle at a height H1 at a standing position of an observer, an angle at a height H2 at a crouching position, and an angle at a height H3 at a seating position are set with respect to the evaluation spot Wa.

The observation angle of the projected stripe pattern is set by combination of the angle (±θ) in the front-rear direction and the angle (heights H1, H2, H3) in the height direction as described above. Thus, in the case of the present embodiment, a total of six observation angle patterns is settable. For example, the computer 102 (observation angle setter 12) sets, as an initial value, the front (+75°) and the angle at the height H1 at the standing position, and every time angle change timing (later-described Step S11) comes, sequentially changes the value to the remaining five angle combinations (front+height H2, front+height H3, rear+height H1, rear+height H2, and rear+height H3). With this configuration, the observation angle at which the deformation at the evaluation spot Wa is most visible can be selected.

Figure 7:
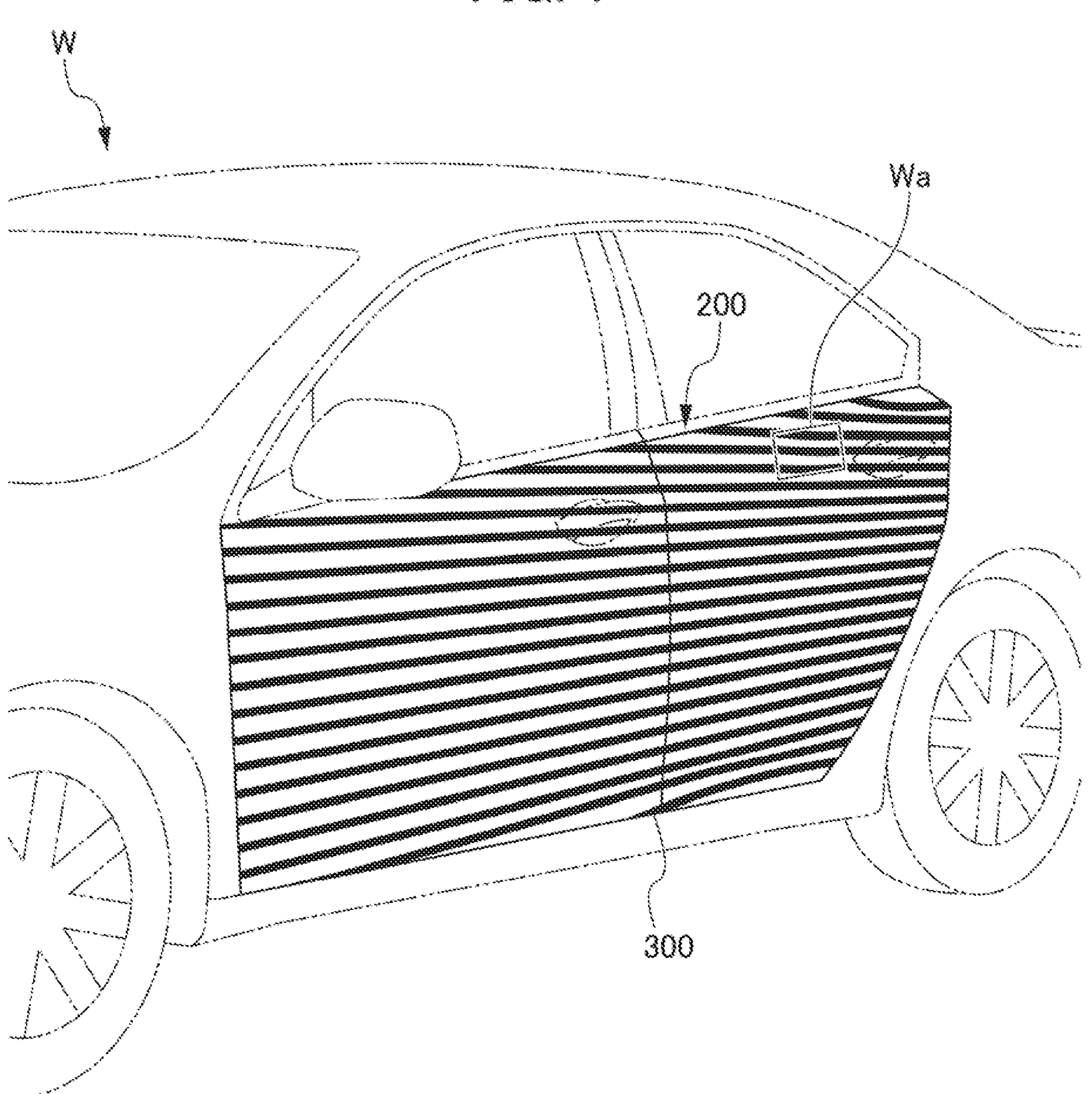
FIG. 7 is a view showing a projected stripe pattern on the workpiece.

Next, in Step S4, the computer 102 (stripe projector 11) projects the stripe pattern (projected stripe pattern 300) on the determination target surface created in Step S2, as shown in FIG. 7. The stripe pattern can be projected using a zebra pattern function of existing three-dimensional CAD software (stripe pattern projection step).

Subsequently, in Step S5, the computer 102 (stripe projection angle setter 13) sets the stripe projection angle of the projected stripe pattern 300 based on the curvature of the determination target surface (left door 200) (stripe projection angle setting step).

Figure 8:
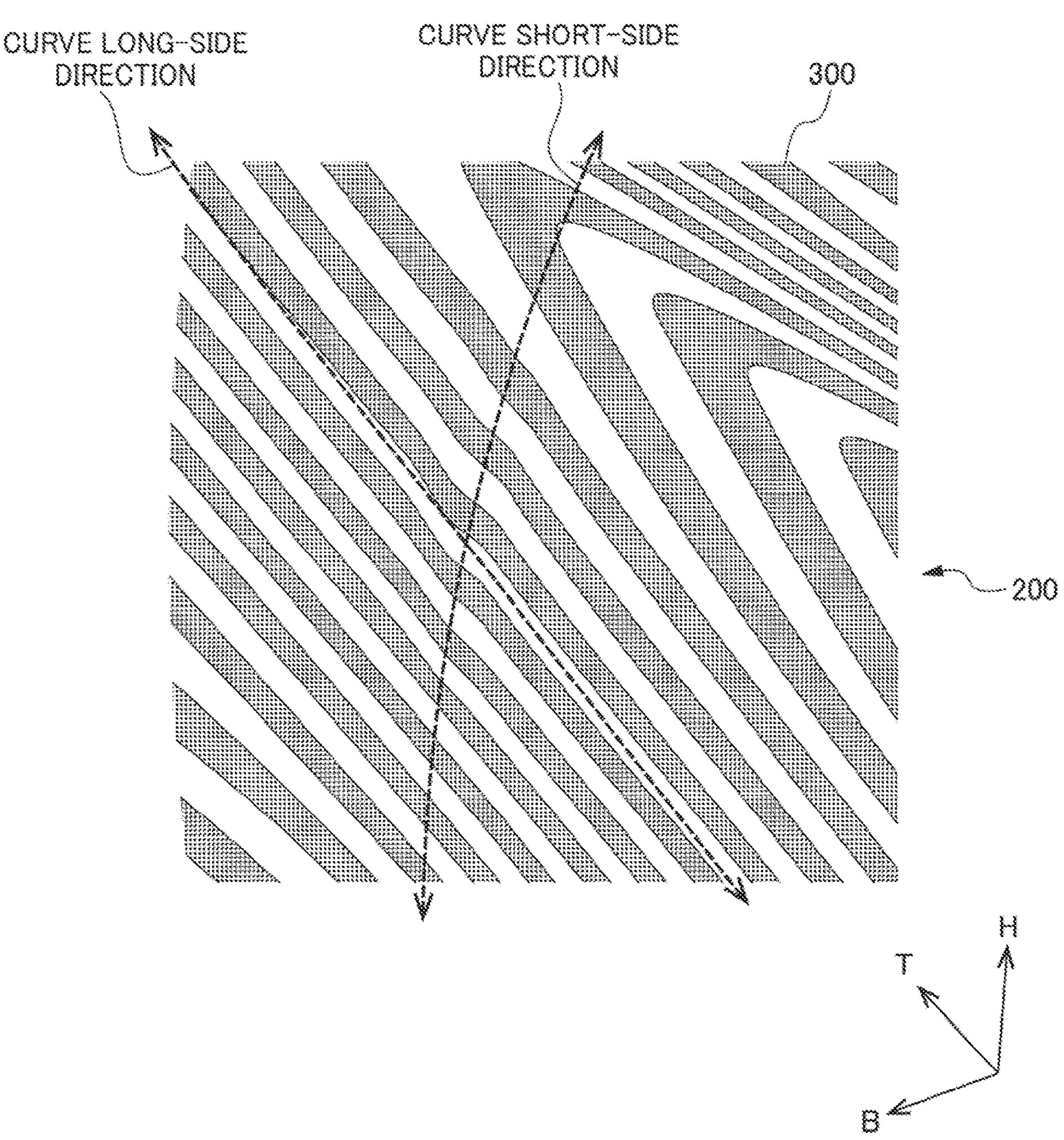
FIG. 8 is a view for describing the curve long-side direction and curve short-side direction of the workpiece.
Figure 9:
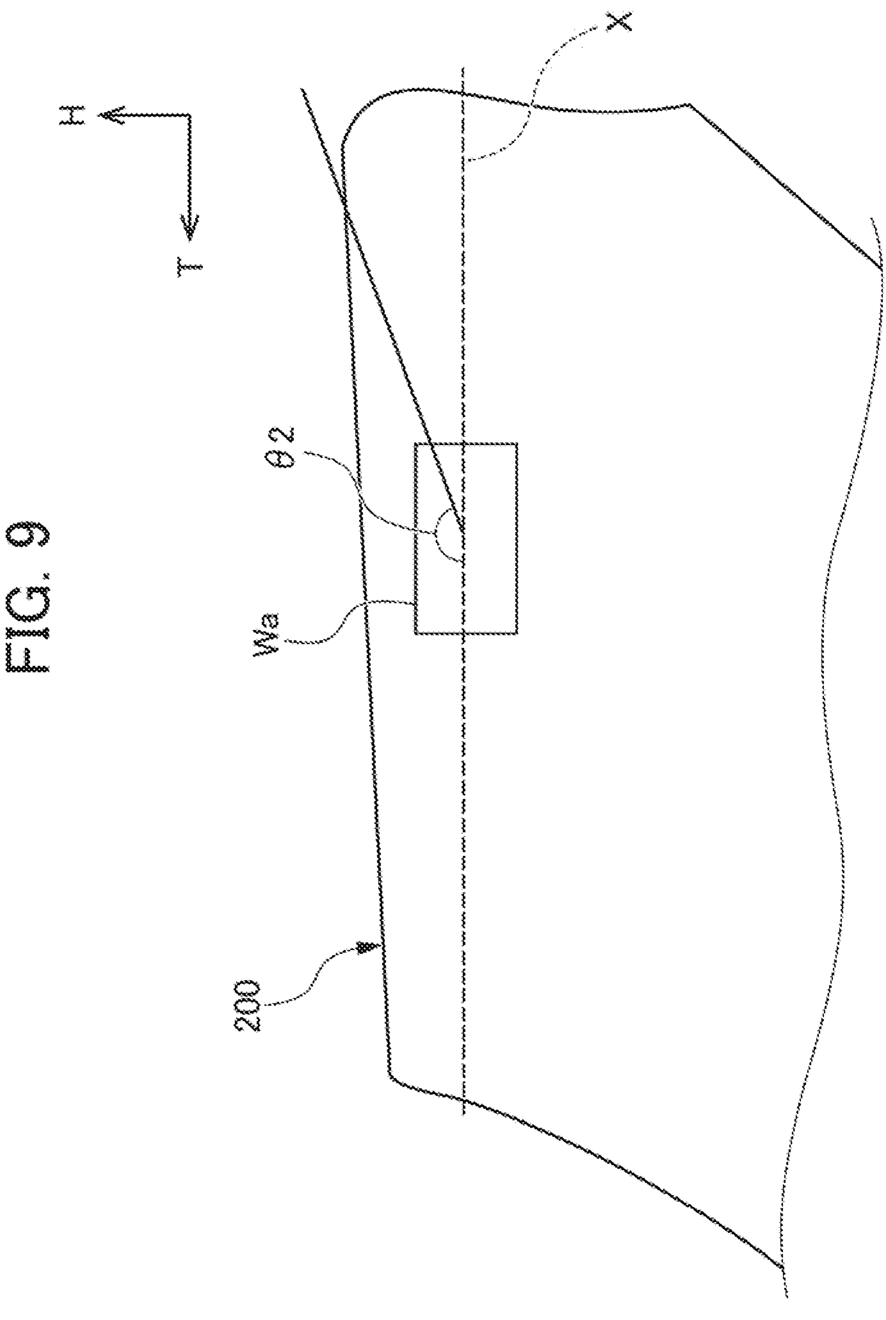
FIG. 9 is a view for describing the stripe projection angle of the projected stripe pattern on the workpiece.

Specifically, as shown in FIG. 8, the curve long-side direction and curve short-side direction of the determination target surface (left door 200) are first compared with each other, and the curve long-side direction which is a direction in which the curvature is the maximum is determined. Next, as shown in FIG. 9, the angle θ2 of a line segment of the projected stripe pattern 300 with respect to the horizontal section line X passing through the evaluation spot Wa on the determination target surface (left door 200) along the curve long-side direction is set as the stripe projection angle of the projected stripe pattern 300. In the present embodiment shown in FIG. 8, the reference projection angle is set to 155° as an initial value of the stripe projection angle (θ2). Thus, in Step S5, the computer 102 (stripe projector 11) sets 155° as the initial stripe projection angle (θ2) of the projected stripe pattern 300.

Note that every time the angle change timing (later-described Step S9) comes, the computer 102 (stripe projector 11) can set the stripe projection angle (02) of the projected stripe pattern 300 in a plurality of stages changed from the reference projection angle (155°) in the ±direction by a predetermined angle. In the present embodiment, the stripe projection angle (02) of the projected stripe pattern 300 is changed from the reference projection angle (155°) which is the initial value in a range of ±30° by ±10°, and therefore, a total of seven patterns of 155°, 165°, 175°, 185°, 145°, 135°, and 125° is set.

Figure 10:
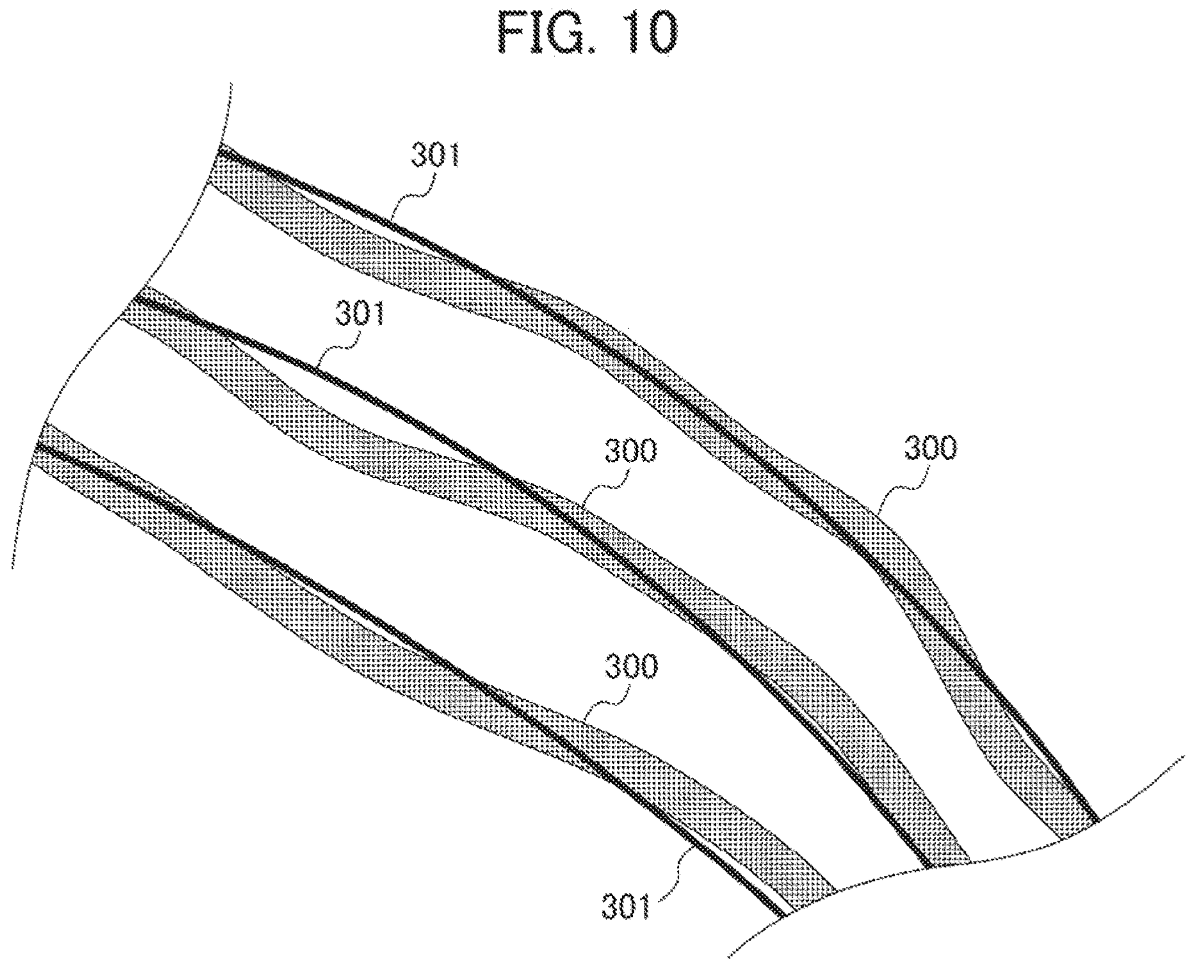
FIG. 10 is a view for describing a method for creating a reference stripe pattern from the projected stripe pattern on the workpiece.

Subsequently, in Step S6, the computer 102 (reference stripe pattern creator 14) performs smoothing for the projected stripe pattern 300 at the evaluation spot Wa on the determination target surface (left door 200), thereby creating a reference stripe pattern 301 (reference stripe pattern creation step), as shown in FIG. 10.

The reference stripe pattern 301 is created, from the projected stripe pattern 300, as such a curved line that the deformation of the surface of the workpiece W is substantially eliminated. Since the reference stripe pattern 301 is created using the projected stripe pattern 300 which is an actual measurement line, the computer 102 (reference stripe pattern creator 14) can create the reference stripe pattern 301 without the need for additional shape data such as reference shape data on the workpiece W.

Subsequently, in Step S7, the computer 102 (quality determinator 15) compares the projected stripe pattern 300 and the reference stripe pattern 301 at the initial values of the observation angle and the stripe projection angle with each other. Specifically, the computer 102 (quality determinator 15) calculates the deformation of the projected stripe pattern 300, which is a difference between the projected stripe pattern 300 and the reference stripe pattern 301, at the evaluation spot Wa.

Figure 11A:
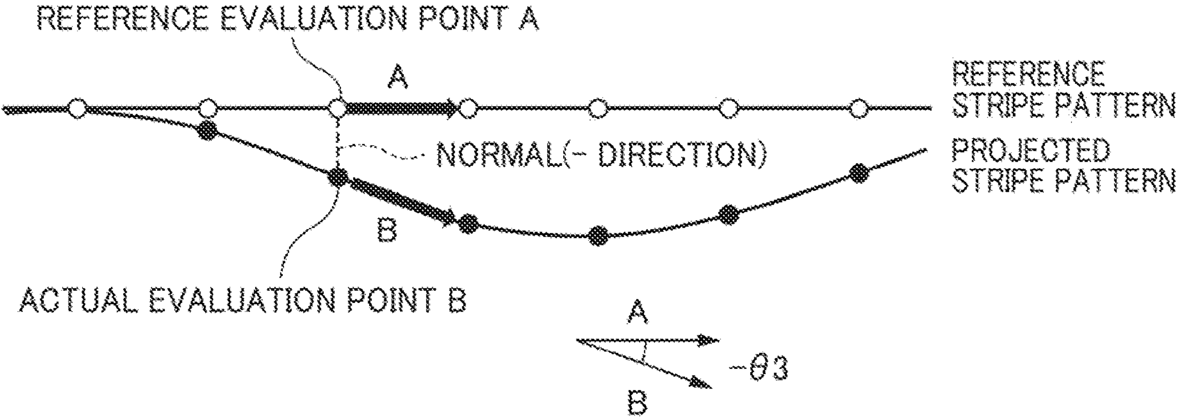
FIG. 11A is a schematic view for describing a method for calculating the angle between the reference stripe pattern and the projected stripe pattern and the amplitude thereof.
Figure 11B:
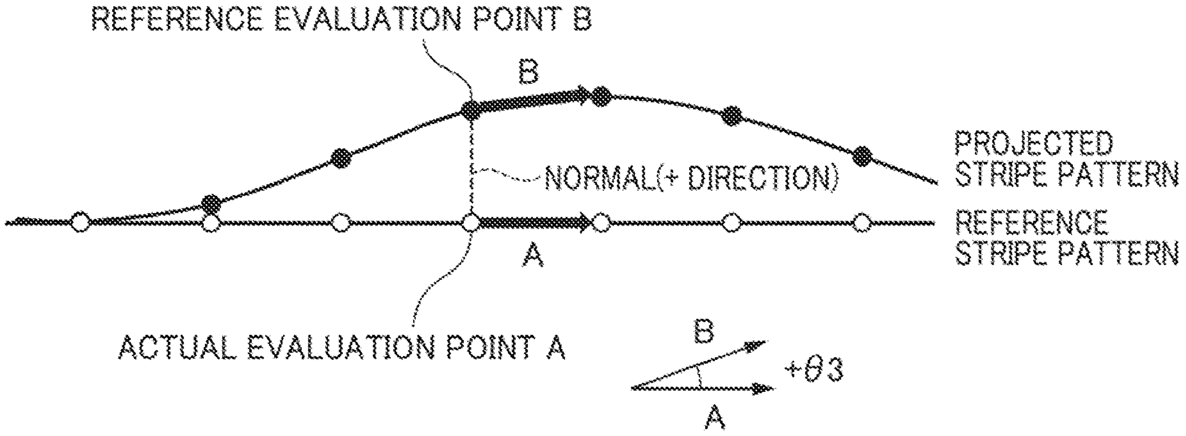
FIG. 11B is a schematic view for describing the method for calculating the angle between the reference stripe pattern and the projected stripe pattern and the amplitude thereof.

The deformation of the projected stripe pattern 300 is obtained from the angle between the projected stripe pattern 300 and the reference stripe pattern 301 at the evaluation spot Wa and the amplitude thereof according to the following expression. Deformation=Angle×Amplitude The angle between the projected stripe pattern 300 and the reference stripe pattern 301 is defined as follows. First, as shown in FIGS. 11A and 11B, an arbitrary evaluation point on the reference stripe pattern 301 is selected, and is defined as a reference evaluation point A. Next, a normal perpendicular to the reference stripe pattern 301 is drawn from the reference evaluation point A, and an intersection between the normal and the projected stripe pattern 300 is defined as an actual evaluation point B corresponding to the reference evaluation point A. Next, a tangent vector A to the reference evaluation point A on the reference stripe pattern 301 and a tangent vector B to the actual evaluation point B on the projected stripe pattern 300 are calculated, and the angle $\pm\theta 3$ between these vectors A, B is defined as the angle between the projected stripe pattern 300 and the reference stripe pattern 301.

Figure 12:
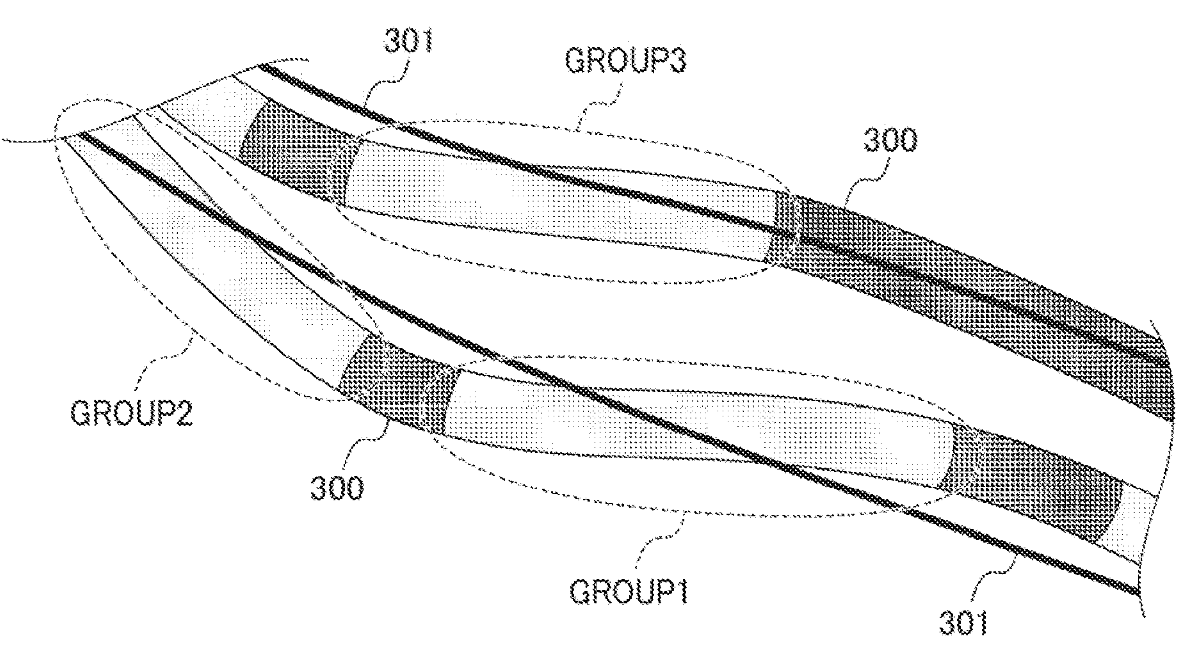
FIG. 12 is a view for describing the method for calculating the angle between the reference stripe pattern and the projected stripe pattern and the amplitude thereof.

The computer 102 (quality determinator 15) calculates, for each of a plurality of evaluation points, the angle $\pm\theta 3$ between the projected stripe pattern 300 and the reference stripe pattern 301. Next, the computer 102 (quality determinator 15) extracts a range in which the absolute value of the calculated angle $\pm\theta 3$ is a predetermined angle or more. In the present embodiment, the predetermined angle is set to 5°. Next, the computer 102 (quality determinator 15) sets, as one group, such an area on the projected stripe pattern 300 that there are consecutive evaluation points at which the absolute value of the calculated angle $\pm\theta 3$ is the predetermined angle or more, as shown in FIG. 12. FIG. 12 shows groups 1 to 3.

The amplitude is obtained from the length of the normal between the reference evaluation point A and the actual evaluation point B corresponding to the reference evaluation point A. In a case where the projected stripe pattern 300 shifts downwardly from the reference stripe pattern 301 as shown in FIG. 11A, the normal between the selected reference evaluation point A and the actual evaluation point B is defined as a "−direction". In a case where the projected stripe pattern 300 shifts upwardly from the reference stripe pattern 301 as shown in FIG. 11B, the normal between the selected reference evaluation point A and the actual evaluation point B is defined as a "+direction".

Since the angle between the projected stripe pattern 300 and the reference stripe pattern 301 changes in the ±direction as described above, the computer 102 (quality determinator 15) calculates the amplitude for each of the above-described groups according to the following expression. Amplitude={(Maximum Value in −Direction)+(Maximum Value in +Direction)}÷2

Next, the computer 102 (quality determinator 15) calculates, from the maximum values of the angle and amplitude calculated for each group, the deformation of each group according to the above-described expression (Angle×Amplitude). The calculated deformation value is stored in the storage 16.

The computer 102 (quality determinator 15) executes deformation calculation for one evaluation spot Wa for each of the plurality of different observation angles and each of the plurality of different stripe projection angles. Thus, subsequently in Step S8, the computer 102 (quality determinator 15) determines whether or not comparison between the projected stripe pattern 300 and the reference stripe pattern 301 has been completed for all the stripe projection angles of the projected stripe pattern 300 in a range of ±30° from the reference projection angle (155°). Here, since the stripe projection angle is set to the initial value of the reference projection angle (155°), Step S8 is NO, and the processing proceeds to Step S9.

In Step S9, the computer 102 (quality determinator 15) changes the stripe projection angle to, e.g., an angle (165°) obtained by addition of 10° to the reference projection angle) (155° which is the initial value. Thereafter, the computer 102 (quality determinator 15) repeats the processing from Step S5 to Step S8 as described above. When the processing from Step S5 to Step S7 as described above is completed for all the seven stripe projection angles changed from the reference projection angle (155°) in a range of ±30° by ±10°, Step S8 is YES, and the processing proceeds to Step S10.

Subsequently, in Step S10, the computer 102 (quality determinator 15) determines, for the evaluation spot Wa on the determination target surface, whether or not there are other observation angles, i.e., whether or not comparison between the projected stripe pattern 300 and the reference stripe pattern 301 has been completed for all the observation angles. Here, since the observation angle is set to the initial value which is the front +75° and the angle at the height H1 at the standing position, Step S10 is NO, and the processing proceeds to Step S11.

In Step S11, the computer 102 (quality determinator 15) changes the observation angle from the initial value which is the front +75° and the angle at the height H1 at the standing position to, e.g., the front +75° and the angle at the height H2 at the crouching position. Thereafter, the computer 102 (quality determinator 15) repeats the processing from Step S3 to Step S10 as described above. When the processing from Step S3 to Step S8 as described above is completed for all the six observation angles, Step S10 is YES, and the processing proceeds to Step S12.

In Step S12, the computer 102 (quality determinator 15) makes quality determination on the evaluation spot Wa on the determination target surface from comparison results in the range of each of the stripe projection angle and the observation angle (quality determination step).

That is, the computer 102 (quality determinator 15) compares the calculated deformation values for each group in the range of each of the stripe projection angle and the observation angle, and the maximum deformation value is taken as a representative value. Using the representative value, the quality of the evaluation spot Wa of the workpiece W is determined. The quality can be determined in such a manner that the representative deformation value and a threshold are compared with each other and the quality is determined as poor in a case where the deformation value exceeds the threshold.

After quality determination in Step S12 has ended, the quality determination processing ends.

According to the workpiece quality determination system 1 described above, the following advantageous effects are provided.

In the workpiece quality determination system 1, the observation angle setter 12 sets the observation angle at which the projected stripe pattern 300 on the workpiece W is observed, the stripe projection angle setter 13 sets the stripe projection angle of the projected stripe pattern 300 at the set observation angle, and the reference stripe pattern creator 14 creates the reference stripe pattern 301 from the projected stripe pattern 300 at the set stripe projection angle. Then, the quality determinator 15 calculates the difference between the projected stripe pattern 300 and the reference stripe pattern 301 at the stripe projection angle, and makes quality determination based on the difference. According to this configuration, since the reference stripe pattern 301 is created from the projected stripe pattern 300 on the workpiece W, it can be automatically determined, without the need for the reference shape data on the workpiece W, whether or not the surface of the workpiece W is subjected to deformation. Since the reference stripe pattern 301 is created from the projected stripe pattern 300, evaluation can be made with reference to an actual appearance. Since the observation angle of the projected stripe pattern 300 on the workpiece W and the stripe projection angle of the projected stripe pattern 300 at each observation angle are set, the surface of the workpiece W can be quantitatively evaluated from various angles, and therefore, high-accuracy quality determination can be made without variation in the evaluation results.

In the above-described workpiece quality determination system 1, the stripe projection angle with respect to the curve long-side direction of the workpiece W is taken as the reference projection angle, and the quality determinator 15 makes quality determination by changing the stripe projection angle to the plurality of angles from the reference projection angle. According to this configuration, since the stripe projection angle is set with reference to the curve long-side direction of the workpiece W, stable results can be obtained particularly in a case where the determination target surface is a narrow curved surface. With this configuration, the workpiece quality determination system 1 can be provided with high versatility.

In the above-described workpiece quality determination system 1, the difference between the projected stripe pattern 300 and the reference stripe pattern 301 is obtained based on the angle between the projected stripe pattern 300 and the reference stripe pattern 301 and the amplitude thereof. According to this configuration, since the difference is calculated from the angle between the projected stripe pattern 300 and the reference stripe pattern 301 and the amplitude thereof, a complicated step such as a step of sliding the reference stripe pattern 301 with respect to the projected stripe pattern 300 is not necessary. Thus, quality determination can be made more easily and quickly.

According to the above-described workpiece quality determination method, advantageous effects similar to those of the above-described workpiece quality determination system 1 are provided.

EXPLANATION OF REFERENCE NUMERALS

1 Workpiece Quality Determination System
12 Observation Angle Setter
13 Stripe Projection Angle Setter
14 Reference Stripe pattern Creator
15 Quality Determinator
300 Projected Stripe Pattern
301 Reference Stripe Pattern
W Workpiece

What is claimed is:

1. A workpiece quality determination method for determining a quality of a workpiece based on a stripe pattern projected on a surface of the workpiece, comprising:

observation angle setting of setting an angle at which the stripe pattern projected on the workpiece is observed;

stripe projection angle setting of setting a stripe projection angle of the projected stripe pattern at the set observation angle;

reference stripe pattern creation of creating a reference stripe pattern from the projected stripe pattern by performing smoothing for the projected stripe pattern at the set stripe projection angle; and quality determination of calculating a difference between the projected stripe pattern and the reference stripe pattern at the stripe projection angle to determine the quality based on the difference.

2. The workpiece quality determination method according to claim 1, wherein the stripe projection angle with respect to a curve long-side direction of the workpiece is taken as a reference projection angle, and in the quality determination, the quality is determined by changing the stripe projection angle to a plurality of angles from the reference projection angle.

3. The workpiece quality determination method according to claim 1, wherein the difference is obtained based on an angle between the projected stripe pattern and the reference stripe pattern and an amplitude thereof.

4. A workpiece quality determination system for determining a quality of a workpiece based on a stripe pattern projected on a surface of the workpiece, the system comprising a processor that executes programs stored in memory, the processor being configured to perform the following processing of:

setting an observation angle at which the stripe pattern projected on the workpiece is observed;

setting a stripe projection angle of the projected stripe pattern at the set observation angle;

creating a reference stripe pattern from the projected stripe pattern by performing smoothing for the projected stripe pattern at the set stripe projection angle; and calculating a difference between the projected stripe pattern and the reference stripe pattern at the stripe projection angle to determine the quality based on the difference, wherein the workpiece quality determination system further comprises a camera that photographs the projected stripe pattern and a stripe projection device that that projects a stripe pattern on a surface of the workpiece.

5. The workpiece quality determination system according to claim 4, wherein a stripe projection angle with respect to a curve long-side direction of the workpiece is taken as a reference projection angle, and the quality determinator determines the quality by changing the stripe projection angle to a plurality of angles from the reference projection angle.

6. The workpiece quality determination system according to claim 4, wherein the difference is obtained based on an angle between the projected stripe pattern and the reference stripe pattern and an amplitude thereof.

7. A workpiece quality determination method for determining a quality of a workpiece based on a stripe pattern projected on a surface of the workpiece, comprising:

observation angle setting of setting an angle at which the stripe pattern projected on the workpiece is observed;

stripe projection angle setting of setting a stripe projection angle of the projected stripe pattern at the set observation angle;

reference stripe pattern creation of creating a reference stripe pattern from the projected stripe pattern at the set stripe projection angle; and quality determination of calculating a difference between the projected stripe pattern and the reference stripe pattern at the stripe projection angle to determine the quality based on the difference, wherein the stripe projection angle with respect to a curve long-side direction of the workpiece is taken as a reference projection angle, and in the quality determination, the quality is determined by changing the stripe projection angle to a plurality of angles from the reference projection angle.

8. The workpiece quality determination method according to claim 7, wherein the difference is obtained based on an angle between the projected stripe pattern and the reference stripe pattern and an amplitude thereof.

9. A workpiece quality determination system for determining a quality of a workpiece based on a stripe pattern projected on a surface of the workpiece, the system comprising a processor that executes programs stored in memory, the processor being configured to perform the following processing of:

setting an observation angle at which the stripe pattern projected on the workpiece is observed;

setting a stripe projection angle of the projected stripe pattern at the set observation angle;

creating a reference stripe pattern from the projected stripe pattern at the set stripe projection angle; and calculating a difference between the projected stripe pattern and the reference stripe pattern at the stripe projection angle to determine the quality based on the difference, wherein the workpiece quality determination system further comprises a camera that photographs the projected stripe pattern and a stripe projection device that that projects a stripe pattern on a surface of the workpiece, wherein a stripe projection angle with respect to a curve long-side direction of the workpiece is taken as a reference projection angle, and the quality determinator determines the quality by changing the stripe projection angle to a plurality of angles from the reference projection angle.

10. The workpiece quality determination system according to claim 9, wherein the difference is obtained based on an angle between the projected stripe pattern and the reference stripe pattern and an amplitude thereof.

* * * * *